United States Patent [19]
Bonbon et al.

[11] Patent Number: 5,033,838
[45] Date of Patent: Jul. 23, 1991

[54] GRADIENT INDEX, NULL GEOMETRICAL POWER UNIFOCAL OPHTHALMIC LENS

[76] Inventors: Emmanuel Bonbon, 10 rue Fondary, 75015 Paris; Jean-Louis Mercier, 3 rue du Bon Puits, 91640 Fontenay Les Briis, both of France

[21] Appl. No.: 344,069

[22] Filed: Apr. 25, 1989

[30] Foreign Application Priority Data

Apr. 25, 1988 [FR] France ................... 88 05436

[51] Int. Cl.$^5$ ............................................. G02C 7/02
[52] U.S. Cl. ........................................ 351/159; 350/413
[58] Field of Search ...................... 350/413; 351/159

[56] References Cited

U.S. PATENT DOCUMENTS 3,816,160  6/1974  Moore .................. 350/413 X
4,561,736 12/1985  Fürter ....................... 351/159

FOREIGN PATENT DOCUMENTS 0101972 11/1984 European Pat. Off. .
2707601 10/1977 Fed. Rep. of Germany .
2599157 11/1987 France .
2034498  6/1980 United Kingdom .
1571930  7/1980 United Kingdom .
 219017 12/1987 United Kingdom .

Primary Examiner—Scott J. Sugarman
Attorney, Agent, or Firm—Charles A. Brown

[57] ABSTRACT

A unifocal ophthalmic lens has a part-spherical concave surface and a part-spherical convex surface. Its refractive index varies radially from its optical axis to its periphery. It has a null geometrical power so that its optical power is due only to the variation in its refractive index.

3 Claims, 1 Drawing Sheet

GRADIENT INDEX, NULL GEOMETRICAL POWER UNIFOCAL OPHTHALMIC LENS

BACKGROUND OF THE INVENTION

1. Field of the invention

The present invention is generally concerned with unifocal ophthalmic lenses, that is to say constant power lenses, whether they are convergent (positive power) lenses or divergent (negative power) lenses.

It is more particularly directed to lenses in which the convex front surface and the concave rear surface are both part-spherical.

2. Description of the prior art

These lenses have the advantage of being relatively easy to machine.

They give rise to two problems, however.

The first relates to the fact that for relatively high powers their maximum or critical thickness, which is the thickness at the center for a positive power or the thickness at the periphery for a negative power, is relatively high, which is detrimental from the esthetic point of view and, given their resulting weight, from the user comfort point of view.

The second problem relates to the fact that, especially for higher powers, aberrations and in particular astigmatism and field curvature aberrations become increasingly important as the user's axis of vision moves away from the optical axis of the lens.

To minimize such aberrations an aspherical surface is usually employed for at least one surface of the lens, at the cost of complicated machining thereof.

Also, the refractive index of the material contituting ophthalmic lenses is usually uniform.

In the case of ophthalmic lenses with part-spherical concave and convex surfaces the power is then geometrically determined by the refractive index, the radius of curvature of the surfaces and the thickness at the center.

However, it has already been proposed to vary the refractive index of an ophthalmic lens radially from its optical axis to its periphery.

This is the case, for example, in British Patent No. 1 571 930 and also in published French patent application No. 2 599 157.

In both cases this is essentially to correct aberrations.

In more precise terms, in British patent No. 1 571 930, in which the refractive index varies in a quasi linear manner, the preferential arrangement is such that, given this variation in the refractive index, the concave and convex surfaces of the lens concerned are still effectively part-spherical.

In published French patent application No. 2 599 157, in which the concave and convex surfaces are necessarily part-spherical, it is in principle a question of minimizing the critical thickness of the lens.

However, the examples described in this document show that the refractive index does not necessarily vary in any significant manner in the central part of the lens, which is the most used part, and most importantly that the optical power of the lens does not differ in any significant way from its geometrical power.

The present invention is based on the fact, not previously demonstrated, that by appropriately varying the refractive index it is possible to modify significantly the optical power of a lens relative to its geometrical power, while achieving satisfactory correction of astigmatism and field curvature.

It is directed to the manufacture of unifocal ophthalmic lenses which advantageously have accurately part-spherical concave and convex surfaces and are therefore easy to machine, which achieve sufficient correction of astigmatism and field curvature aberrations, and which advantageously have a constant thickness, so that they therefore do not have any increased thickness at their center or at their periphery.

SUMMARY OF THE INVENTION

The invention consists in a unifocal ophthalmic lens having a part-spherical concave surface, a part-spherical convex surface, a refractive index that varies radially from its optical axis to its periphery and a null geometrical power whereby its optical power is due only to the variation in its refractive index.

In essence, the present invention makes it possible to combine advantageously the use of part-spherical concave and convex surfaces, a constant thickness and a good image quality.

The characteristics and advantages of the invention will emerge from the following description to be given by way of example only with reference to the appended diagrammatic drawings.

DESCRIPTION OF THE PREFERRED EMBODIMENTS

Figure 1:
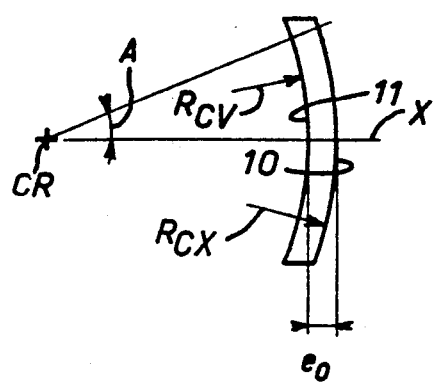
FIG. 1 is an unhatched view in cross-section through a unifocal ophthalmic lens in accordance with the invention.
Figure 3:
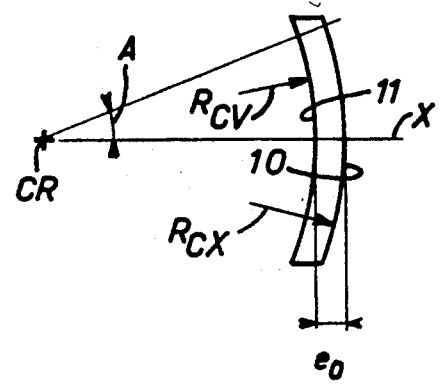
FIGS. 3 and 4 are respectively analogous to FIGS. 1 and 2 for another unifocal ophthalmic lens in accordance with the invention.
Figure 2:
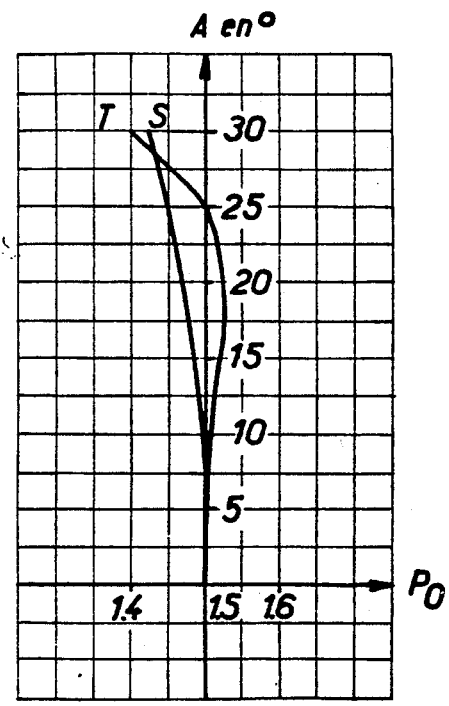
FIG. 2 is a diagram relating to the astigmatism and field curvature aberrations of this lens.

FIGS. 1 and 2 show the application of the invention to a convergent (positive power) ophthalmic lens.

It has a convex front surface 10 and a concave rear surface 11.

Both are part-spherical.

$R_{CX}$ denotes the radius of the convex surface 10 and $R_{CV}$ denotes that of the concave surface 11.

$e_0$ denotes the thickness at the center as measured along the optical axis X of the lens.

If the refractive index of the material from which the lens concerned is made is uniform and has the value $n_0$ then the power of the lens is exclusively determined by its geometry, depending on, in addition to the refractive index $n_0$, the radii $R_{CX}$ and $R_{CV}$ of its convex and concave surfaces and on its thickness at the center $e_0$.

Let $P_G$ denote this power, referred to hereinafter as the geometrical power, which in practise is determined by the following equation:

$$P_G = D_1 + D_2 - \frac{e_0}{n_0} \cdot D_1 \cdot D_2$$

in which $D_1 = (n_0 - 1)/R_{CX}$ and
$D_2 = (n_0 - 1)/R_{CV}$.

In the known way the refractive index n varies radially from the optical axis X of the lens to its periphery.

As the refractive index n varies with the distance r to the optical axis X, the actual power of this lens (referred to hereinafter as the optical power $P_O$) differs slightly from its geometrical power $P_G$, because the refractive index n is involved in the computation.

In accordance with the invention the optical power $P_O$ of the lens is due only to the variation in its refractive index.

Its geometrical power $P_G$ is therefore null.

In other words, $R_{CX}=R_{CV}$ or, at the least, $R_{CX}\simeq R_{CV}$.

Because it therefore has the same thickness at all points, the unifocal ophthalmic lens in accordance with the invention therefore has parallel surfaces.

In practise the law governing the variation of its refractive index n is chosen so that at each point on the lens:

$$\frac{d\ [\mathrm{grad}\ n]}{dr} \neq 0$$

in which, as previously explained, r is the distance from any point on the lens to the optical axis X.

This equation implies that at every point on the lens, including points in its central area, the variation in the refractive index n is not linear, but rather features a certain gradient.

Therefore in accordance with one characteristic of the invention it is by a gradient effect and not by a distribution effect that the variation of the refractive index is caused to "create" the optical power.

Of course, aberrations must be corrected, and in particular aberrations of astigmatism and field curvature.

However, in accordance with the invention the corresponding corrections are limited in that they are not pushed to the extreme but rather made just sufficient for the aberrations to remain within limits of tolerance usually regarded as sufficient, such as apply to conventional ophthalmic lenses of the same type.

Thus in accordance with the invention the variation in the refractive index n is chosen to procure the required power rather than to correct aberrations, to yield unifocal ophthalmic lenses which, while having part-spherical concave and convex surfaces, and which are therefore easy to machine, are advantageously lighter and of better esthetic appearance, because they are of constant thickness, but which nevertheless have sufficient astigmatism and field curvature aberration correction for the latter aberrations to be no worse than what is usually regarded as acceptable.

In practise, it suffices in implementing the invention to determine the geometrical characteristics of the required lens, in this instance the radii $R_{CX}$ and $R_{CV}$ of its convex and concave surfaces and its thickness, for those skilled in the art to know how to choose the law governing the variation in the refractive index n which, while making it possible to obtain the required optical power $P_O$, provides sufficient correction of astigmatism and field curvature aberrations.

The law governing the variation in the refractive index may be expressed as follows, for example:

$$n = n_0 + \sum_{j=1\ \mathrm{to}\ 5} a_j\ r^{2j}$$

$n_0$ being the refractive index on the optical axis X, $a_j$ being numerical coefficients and, as already mentioned hereinabove, r being the distance to the optical axis.

There will now be given by way of non-limiting example numerical values for one possible embodiment of a convergent unifocal ophthalmic lens.

EXAMPLE 1

$R_{CX}=160$ mm
$R_{CV}=159.333$ mm
$e_0=2$ mm $n_0=1.5$

In accordance with the invention the variation in the refractive index is such that the coefficients a of the corresponding law are as follows:

$a_1=0.3732\times 10^{-3}$
$a_2=0.3\times 10^{-7}$
$a_3=0$
$a_4=0.1\times 10^{-12}$
$a_5=0$ With a variation law like this the refractive index decreases from the lens axis X to its periphery and the resulting optical power $P_O$ is:

$P_O=1.5$ dpt.

The refractive index n at a point situated at a radial distance of 15 mm from the optical axis X (this radial distance corresponds in practise to an angle of vision in the order of 30° relative to the optical axis) is:

$n_{15\ mm}=1.427$

The difference $\Delta n$ between this refractive index n and the refractive index $n_0$ on the optical axis X is therefore $-0.073$.

It is therefore greater in absolute terms than 0.07.

The astigmatism and field curvature aberrations that the resulting convergent ophthalmic lens produces emerge from the FIG. 2 diagram.

In this diagram the horizontal axis shows the optical power $P_O$ in diopters and the vertical axis shows the angle of vision A relative to the optical axis X in degrees.

It will be seen that this angle of vision A is established relative to the center of rotation CR of the eye, with the ophthalmic lens assumed to be placed so that its concave rear surface 11 is at a distance of substantially 25 mm from the center of rotation CR.

In the FIG. 2 diagram the curve S corresponds to the sagittal focal length, which is that contained in the plane of FIG. 1, and the curve T corresponds to the tangential focal length, which is that contained in the plane perpendicular to the previous plane.

As is known, the difference $T-S$ corresponds to the astigmatism Ast and the expression $[(T+S)/2-P_O]$ corresponds to the field curvature CC.

The FIG. 2 diagram, which has deliberately been limited to 30°, shows that this angle of vision corresponds normally to the maximum vertical scanning of the human eye, that the astigmatism Ast is less that 0.04 diopters, reaching this value at 22°, and that the field curvature CC, in absolute terms, remains below 0.09 diopters, reaching this value at 30°.

Thus:

$\mathrm{Ast}_{max}=0.04$ dpt at 22°, and
$\mathrm{CC}_{max}=-0.09$ dpt at 30°.

These values for astigmatism and field curvature aberrations are perfectly acceptable.

Also, as the field curvature is negative it can readily be compensated for by accommodation.

FIGS. 1 and 2 show the application of the invention to implementing a divergent (negative power) unifocal ophthalmic lens.

There will now be given a practical example of implementation for the same conditions as hereinabove.

EXAMPLE 2

$R_{CX}=160$ mm $R_{CV} = 159.333$ mm
$e_O = 2$ mm $n_O = 1.5$
$a_1 = 0.5 \times 10^{-3}$
$a_2 = -0.3 \times 10^{-7}$
$a_3 = 0$
$a_4 = 0$
$a_5 = 0$ whence $P_O = 2$ dpt $n_{15\ mm} = 1.597$
$\Delta n = +0.097$
$Ast_{max} = -0.14$ dpt at 30°
$CC_{max} = 0.01$ dpt at 15°

Figure 4:
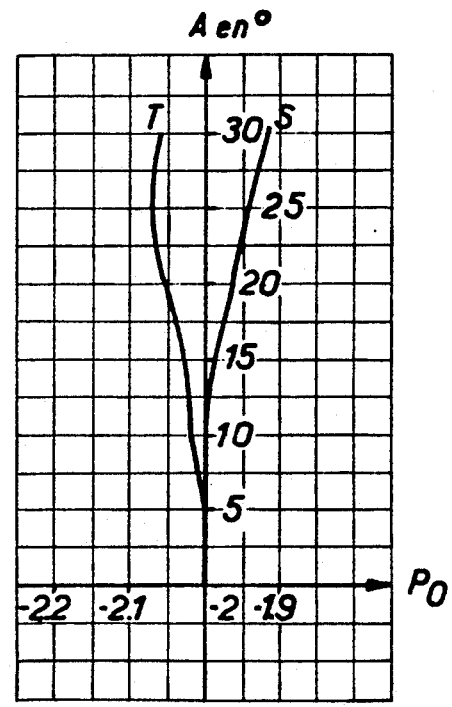

FIG. 4 shows the curves S and T for example 2.

The usual techniques in this art are employed for the practical implementation of the index variation law adopted.

These techniques do not form any part of the present invention and will not be described here.

Applied to a bar, for example, they produce cylindrical iso-index surfaces and the bar treated in this way is then cut into blanks for machining into ophthalmic lenses.

Of course, the invention is not limited to the examples given but encompasses any variant execution thereof.

Also, although it has been assumed in the foregoing description, in order to simplify the latter, that a unifocal lens in accordance with the invention formed an entity in itself, it goes without saying that the invention can be applied equally well to multifocal lenses, for example to bifocal lenses, and could contribute to the formation of a multifocal lens of this kind, itself forming only part thereof.

There is claimed:

1. A unifocal ophthalmic lens having a part-spherical concave surface, a part-spherical convex surface, a refractive index that varies radially from its optical axis to its periphery and a null geometrical power whereby its optical power is due only to the variation in its refractive index, the variation in its refractive index also being governed by the equation:

$$n = n_O + \sum_{j=1\ to\ 5} a_j r^{2j}$$

in which $n_0$ is the refractive index on the optical axis, $a_j$ are numerical coefficients and r is the distance from any point on the lens to the optical axis.

2. A unifocal ophthalmic lens having apart-spherical concave surface, a part-spherical convex surface, a refractive index that varies radially from its optical axis to its periphery and a null geometrical power, whereby its optical power is due only to the variation in its refractive index, the absolute value of the difference between the refractive index on the optical axis and that at any point at a radial distance of 15 mm from the optical axis being greater than 0.07.

3. A unifocal ophthalmic lens having a part-spherical concave surface, a part-spherical convex surface, a refractive index that varies radially from its optical axis to its periphery and a null geometrical power whereby its optical power is due only to the variation in its refractive index, the variation in its refractive index being governed by the equation:

$$\frac{d\ [grad\ n]}{dr} \neq O$$

in which r is the distance from any point on the lens to the optical axis, the variation in its refractive index also being governed by the equation:

$$n = n_O + \sum_{j=1\ to\ 5} a_j r^{2j}$$

in which $n_0$ is the refractive index on the optical axis, $a_j$ are numerical coefficients and r is the distance from any point on the lens to the optical axis.

* * * * *